Figure 1:
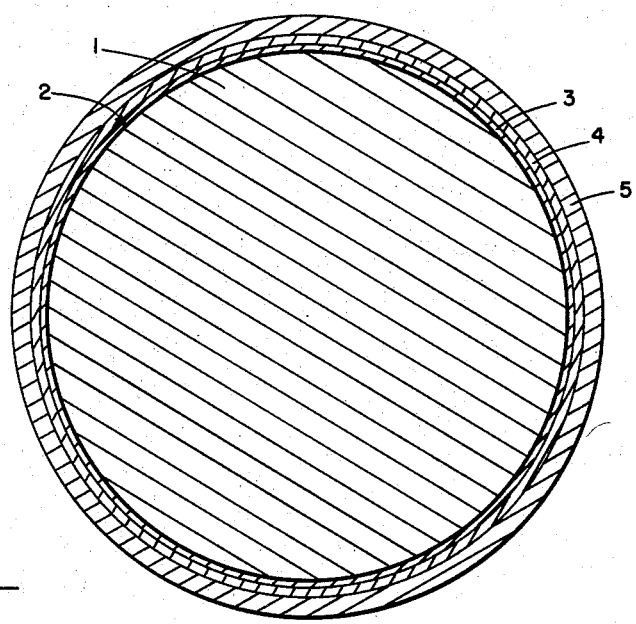

Sept. 16, 1958      W. E. ABBOTT ET AL      2,852,460

FUEL-BREEDER FUEL ELEMENT FOR NUCLEAR REACTOR

Filed Aug. 6, 1956

*INVENTORS*
RALPH BALENT
WILLIAM E. ABBOTT

BY

ATTORNEY

United States Patent Office 2,852,460
Patented Sept. 16, 1958

---

2,852,460

FUEL-BREEDER FUEL ELEMENT FOR NUCLEAR REACTOR

William E. Abbott, East Pittsburgh, Pa., and Ralph Balent, Tarzana, Calif., assignors, by mesne assignments, to the United States of America as represented by the United States Atomic Energy Commission Application August 6, 1956, Serial No. 602,401

5 Claims. (Cl. 204—193.2)

Our invention relates to an improved nuclear reactor fuel element, and more particularly to an improved fuel-breeder fuel element.

For information concerning the theory, construction and operation of nuclear reactors, reference is made to Glasstone, "Principles of Nuclear Reactor Engineering" (D. Van Nostrand); "The Reactor Handbook" (3 volumes) available for sale from the Technical Information Service, Oak Ridge, Tennessee; U. S. Patents 2,708,656 and 2,714,577 to Fermi et al.; and to "The Proceedings of the International Conference on Peaceful Uses of Atomic Energy," August 8–20, 1955, Geneva, Switzerland, available for sale at the United Nations' Book Store, New York, New York.

Unless otherwise specified, conventional, accepted nuclear terminology will be used herein. For example, "fissionable material" refers to thermal neutron fissionable plutonium, uranium-235, and uranium-233, and "fertile material" refers to thorium and uranium-238, which are capable of transmutation to fissionable species by neutron capture and beta decay. When uranium, thorium or plutonium is spoken of, this embraces both the metal and refractory oxides, such as $ThO_2$ and $UO_2$.

In the development of economically competitive nuclear power, particular attention is being given to the conversion or breeding of new fissionable species. Since the supply of uranium is limited, widespread use of nuclear power requires the conversion of relatively abundant thorium to uranium-233 and of uranium-238 to plutonium. The resulting uranium-233 and plutonium can then be used for the further conversion of fertile material; thus, the potential exists for actually increasing the amount of fissionable material while, at the same time, extracting useful power. Furthermore, successful breeding, in providing a by-product of great value, significantly reduces the unit cost of generating nuclear power.

Fertile material is generally employed in reactors known as "breeder-type" reactors, wherein the breeding is conducted along with the consumption of fissionable material. The manner and form in which the fertile material is employed is of considerable importance, for low fabrication and recovery costs are essential to the economical operation of such reactors. In the past, fertile material has been employed in various ways. For example, plutonium has been bred from uranium-238 in large, graphite-moderated, air or water-cooled, natural uranium reactors. Thorium may be used in uranium-thorium alloys and as a blanket material in two-region reactors. In such two-region reactors, the thorium has been employed in various forms, such as in solid rods, thoria suspensions and nitrate solutions. Where the fissionable and fertile materials have been mixed, they must be separated in reprocessing, thereby raising costs. Assembly costs have also been high, due, in many cases, to the use of cladding materials; little or no cladding is ideal. Physical separation allows for easier reprocessing, since most of the fission products will remain in the fuel. Heat transfer problems have also been severe. Heat removal ability usually defines the power level, and in heterogeneous reactors this has been set by the uranium temperature in the center of the rod. To avoid this, and yet maintain a high flux, fuel elements comprising a cluster of relatively small diameter uranium rods have been designed. However, this only aggravates fabricational and decontamination costs.

An object of our invention, therefore, is to provide an improved fuel-breeder fuel element.

Another object is to provide a fuel-breeder fuel element, wherein the fertile and fissionable materials are separated and there is a minimum of cladding.

Another object is to provide such a fuel element which permits fabrication and decontamination economies.

Another object is to provide such a fuel element, wherein a single, relatively large diameter fuel element is the equivalent of a cluster of smaller diameter rods.

Still another object is to provide such a fuel element of improved heat transfer characteristics whereby higher flux levels can be safely reached.

Yet another object is to provide such a fuel element of improved heat transfer characteristics, wherein the power level is not limited by the central temperature of the fuel element.

A further object is to provide such a fuel element wherein a single coolant may be used for both the fissionable and fertile material.

These and other objectives of our invention will become apparent to those skilled in the art from the following detailed description, the attached claims and the accompanying drawings. In the drawings, Figure 1 is a cross-section of our fuel element and Figure 2 is a longitudinal section of an embodiment for a particular, known reactor.

In accordance with our present invention, we have provided an improved fuel element comprising a container, a central core of fertile material in said container, a first bonding material surrounding said core, a sheet of fissionable material immediately surrounding said first bonding material, and a second bonding material surrounding said fissionable material, said seconding bonding material being in contact with said container.

Our fuel element is notably distinct for it provides fabricational and decontamination simplicity through separation of fissionable and fertile material, and through minimum cladding. Also contributing to fabricational and decontamination simplicity is the use of a single, relatively large diameter rod in place of a cluster of smaller diameter rods. With the fissionable material on the outside of the rod, the power level is not limited by a central temperature. Concentrating the fissionable material nearer the coolant provides for efficient heat transfer, and the same coolant is used for both the fertile and fissionable material. The conversion factor is surprisingly quite high; contrary to what might be expected, the fissionable material surrounding the fertile material does not act as a filter or neutron sink. With conversion occurring right in the fuel element, new fissionable material is created, which, in turn, can be used to sustain the chain fission reaction. Having such marked advantages, our fuel element has great promise of contributing to the economical development of nuclear power.

Figure 2:
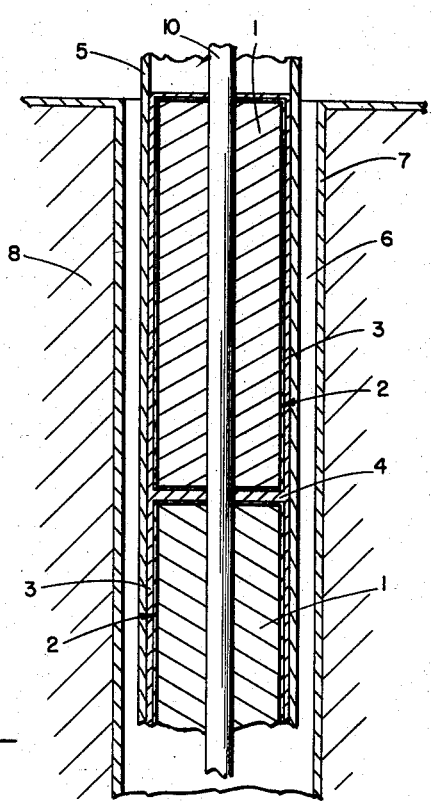

Referring now to Figure 1, fertile material 1, of thorium or uranium-238, occupies the central core of the element. Bonding agent 2 surrounds and is in contact with the core 1 and may be composed of a suitable molten inorganic medium, such as sodium, sodium-potassium, bismuth, bismuth-tin and fused fluoride salts, for instance, alkali fluorides. A thin cylinder containing fissionable material 3, such as uranium or plutonium, is in contact with bonding material 2. When uranium is used, it is preferably highly enriched (e. g., at least 90%) in a fissionable species, such as U-223 or U-235. Surrounding the fissionable material is a second bonding agent 4 of composition similar to bonding agent 2. Bonding agent 4 is in contact with the fissionable material and with the interior surface of container 5. The container may be composed of any metal of suitable nuclear and metallurgical properties, for instance, zirconium or stainless steel. The bonding agents provide thermal contact for efficient heat transfer; and they also permit small dimensional changes in the solid material due to radiation and thermal cycling, without rupture of the fuel element.

An example of our invention will now be given showing its adaptability to a particular reactor. This reactor is the Sodium Reactor Experiment reactor (SRE), a graphite-moderated, sodium cooled reactor which is fully and completely described in a paper delivered by W. E. Parkins at the Geneva Conference on Peaceful Uses of Atomic Energy, entitled "The Sodium Reactor Experiment." This paper is available for sale at the United Nations' Book Store, New York, New York. Unless otherwise indicated, the assembly features of our fuel rod in the reactor are the same as that shown in the paper, except that a single fuel rod replaces the seven rod fuel cluster in each fuel chamber.

Figure 2 is a longitudinal cross-section of our fuel element in a fuel channel of the SRE. Hanger rod 10 supports a column of separate, 6" length fuel rods. Surrounding rod 10 is fertile material 1. Around this is bonding agent 2, bonding and providing thermal contact between fertile material 1 and fissionable material 3. Bonding agent 4, which is not confined to a single fuel slug, but rather runs the entire length of the fuel rod, provides thermal contact between fissionable material 3 and zirconium thimble 5, which contains the 6' column of 6" fuel slugs. Molten sodium coolant flows in coolant channel 6. Zirconium sheet 7 cans graphite moderator 8, providing protection from the molten coolant.

Table 1, below shows the particular design data for the fuel assembly of Figure 2 in the SRE:

TABLE I

*Design data*

A. Materials:
- Coolant channel _____ Zr.
- Coolant _____ Na.
- Fuel thimble_____ Zr.
- Bond material_____ NaK.
- Fissionable material_____ U-235.
- Enrichment (uranium)__ 93.5%.
- Total fuel_____ 60 kg. (fissionable material).
- Fertile material_____ Th.
- Hanger rod_____ 304L Stainless Steel.

B. Dimensions:
- Coolant channel—
  - O. D_____ 2.875".
  - Wall thickness_____ .035".
- Fuel thimble—
  - O. D_____ 2.165".
  - Wall thickness_____ .035".
- Bond material, radial thickness _____ .020".
- Fissionable material, radial thickness _____ .010".
- Bond material, radial thickness _____ .005".
- Fertile material—
  - O. D_____ 2.025".
  - I. D_____ .500".
- Hanger rod, O. D_____ .495".
- Length of fuel slug_____ 6".
- Length of fuel rod_____ 6'.
- Number of slugs in one rod__ 12.

C. Operating data:
- Maximum temperature of fissionable material_____ 1200° F.
- Maximum temperature of fertile material_____ 1800° F. (Th).
- Number of rods_____ 31.
- Power level_____ 20 Mw.

While the above example shows the particular suitability and adaptability of our invention for the SRE, it is understood that this is only by way of illustration and is not restrictive. Employing the fundamental features of our fuel-breeder assembly, suitable modification may be made for its use in reactors of other design. Therefore, our invention should be limited only as is indicated by the appended claims.

Having thus described our invention, we claim:

1. A reactor fuel element comprising a thimble, a central rod in said thimble, said thimble and said rod having relatively low thermal neutron absorption cross sections, a core of a fertile material selected from the group consisting of uranium-238 and thorium immediately surrounding said rod, said core surrounded by a first thermal bonding material of a molten inorganic medium of relatively low thermal neutron absorption cross-section selected from the group consisting of fused fluoride salts, sodium, sodium-potassium, bismuth, and bismuth-tin, a sheet of fissionable material immediately surrounding said first bonding material, and a second bonding material of said molten inorganic medium surrounding said fissionable material and in contact with the interior surface of said thimble.

2. A reactor fuel element comprising a cylindrical thimble, a central rod in said thimble, said thimble and said rod having relatively low thermal neutron absorption cross sections, a plurality of discrete fuel slugs axially mounted on said rod, each of said slugs comprising a central, cylindrical core of fertile thorium immediately surrounding said central rod, a concentric cylinder of fissionable material surrounding said thorium, and a molten inorganic bonding medium of relatively low thermal neutron absorption cross-section selected from the group consisting of fused fluoride salts, sodium, sodium-potassium, bismuth and bismuth-tin disposed in the annulus between said thorium and fissionable material, and a second said molten inorganic bonding medium disposed in the annulus between said fuel slugs and said thimble and between each of said fuel slugs.

3. The assembly of claim 2, wherein said thimble is zirconium, each of said bonding agents is sodium potassium, said fissionable material is uranium enriched in uranium-235.

4. A reactor fuel element comprising a container having a relatively low thermal neutron absorption cross section, a central core of fertile thorium in said container, a molten inorganic bonding medium of relatively low thermal neutron absorption cross-section selected from the group consisting of fused fluoride salts, sodium, sodium-potassium, bismuth and bismuth-tin immediately surrounding said core, a layer of uranium immediately surrounding said bonding medium, and a second region of said bonding medium disposed between said uranium and said container.

5. The fuel element of claim 4, wherein said bonding medium is sodium-potassium.

References Cited in the file of this patent

International Conference on the Peaceful Uses of Atomic Energy, 1956, United Nations, N. Y., vol. 9, pp. 179–185.